United States Patent Office 3,089,717
Patented May 14, 1963

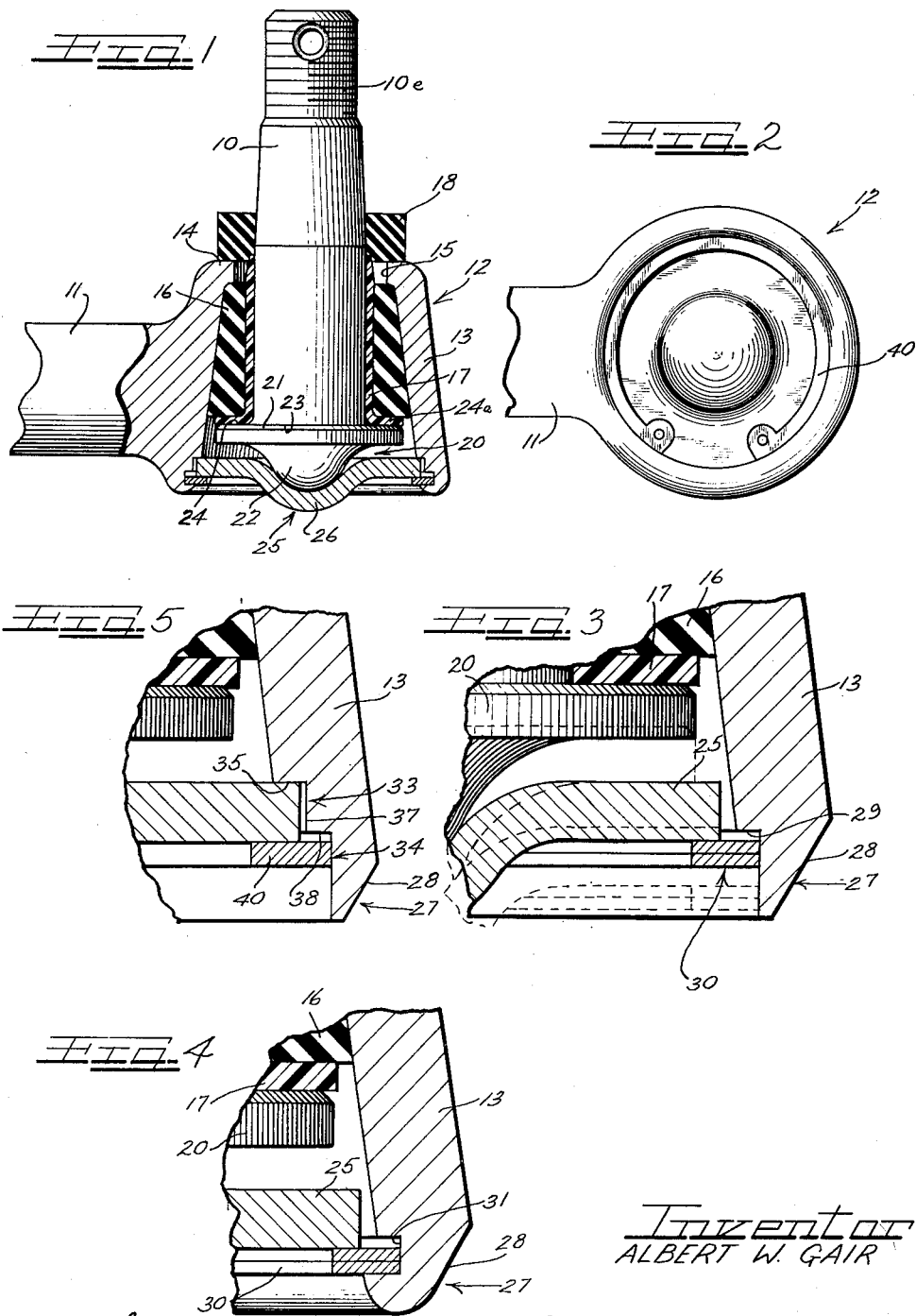

3,089,717
READILY DISASSEMBLED JOINT SOCKET ASSEMBLY AND METHOD OF MAKING SAME
Albert W. Gair, Fraser, Mich., assignor to Thompson Ramo Wooldridge Inc., a corporation of Ohio
Filed May 26, 1958, Ser. No. 737,897
2 Claims. (Cl. 287—85)

This invention relates to a joint socket assembly which may be readily and expeditiously disassembled and reassembled for examination or service.

Joint socket assemblies are often provided to interconnect a pair of movable struts or links and often include, as is well known in the art, a resilient member or a relatively low friction member or the like in the connecting socket assembly or both. Obviously, however, either the resilient member or the low friction member or both may become unsatisfactory in use to perform their desired function after prolonged wear. Furthermore, and more generally, spring members and/or bearings and the like, are often incorporated in joint socket assemblies and it may become desirable to provide a means for expeditiously disassembling the socket assembly to replace any worn or nonfunctioning parts.

In the past joint socket assemblies were generally formed with a cover or reaction plate and arranged so that the cover or reaction plate was permanently maintained in engagement with the socket member by rolling or spinning the edges of the socket member over the peripheral edge of the reaction plate to thus seal the interior parts within the socket assembly.

Accordingly, in order to provide a means for readily disassembling a joint socket assembly, applicant contemplates a means and method of removably affixing the reaction plate to the socket member wherein the annular lip of the socket member is counterbored to receive a collapsible retaining ring which, in turn, removably supports the reaction plate.

It is further contemplated that the reaction plate and retaining ring be positioned within the hollow counterbored socket member after the insertion of the other interior parts therein and that the annular edge or lip of the socket member then be spun-over the annular lateral surface of the retaining ring. In this manner, the lip then forms one supporting wall of the retaining ring groove.

It may be desirable to form the retaining ring groove in the spin-over operation of slightly greater dimension than the thickness of the retaining ring to permit free removal of the ring from the groove to permit servicing of the interior parts of the socket member. On the other hand, it may be desirable from the standpoint of production to spin-over the annular lip of the socket member tightly against the retaining ring so that after removal for servicing a thinner retaining ring can be utilized in the reassembly process.

It is, accordingly, a principal object of this invention to provide a joint socket assembly which may be readily disassembled.

It is another object of this invention to provide a method for manufacturing a readily disassembled joint socket assembly.

It is a further object of this invention to provide a means for removably affixing the reaction or enclosure plate of a joint socket assembly to the hollow socket member.

It is a still further object of this invention to provide a joint socket assembly wherein the hollow socket member is counterbored to receive the reaction or enclosure plate and a retaining ring, wherein the annular lip of the hollow socket member is spun-over the retaining ring in the manufacturing operation to provide a retaining ring groove, which retaining ring acts to position the reaction plate within the socket member so that the retaining ring and consequently the reaction plate supported thereby may readily be removed for the purpose of servicing interior parts within the hollow socket member.

These and other objects of the invention will become apparent from time to time as the following specification proceeds and with reference to the accompanying drawings wherein:

FIGURE 1 is a vertical sectional view through a joint socket assembly constructed in accordance with the principles of the present invention;

FIGURE 2 is a bottom plan view of the socket assembly illustrated in FIGURE 1 and showing the utilization of a split type removable retaining ring;

FIGURE 3 is an enlarged fragmentary sectional view of a socket member having a single counterbore before the spin-over operation;

FIGURE 4 is a fragmentary vertical sectional view through a joint socket assembly constructed in accordance with the principles of the present invention illustrating the socket member formed with a single counterbore after the spin-over operation and showing the utilization of a spiral type retaining ring; and FIGURE 5 is a sectional view similar to FIGURE 3 but showing the formation of a double counterbore in the socket member before the spin-over operation and the utilization of a split type retaining ring.

In the embodiment of the invention illustrated in FIGURE 1, there is shown a socket stud member 10 and a strut member 11 which are positioned with their axes perpendicular to one another. The outer end of strut 11 terminates in an integral inverted cup or socket member 12 having an annular wall 13 diverging from the lateral end surface 14 thereof. An annular aperture 15 in the lateral end surface 14 of cup member 12 is formed with a diameter substantially greater than the diameter of the stud 10 to movably receive stud 10 therethrough. The stud 10 may be secured to a second strut or link by means of the threaded end 10a in the conventional manner.

In the illustrated joint socket assembly, a neoprene bushing 16 and a nylon self-lubricating liner 17 are shown as being disposed between the outer annular wall of the stud 10 and the inner annular surface of diverging wall 13. The self-lubricating nylon liner 17 fits about the stud 10 and provides a low friction surface with respect to which the stud 10 can rotatably move. A resilient sealing ring 18 overlies the lateral end surface 14 of the cup member 12 and is circumferentially positioned about the stud 10 to provide a seal over the aperture 15 to keep foreign particles from the interior of the hollow cup member 12.

A ball member 20 having a flat annular surface 21 and having a protruding ball 22 on one side thereof is positioned adjacent the inner flat end surface 23 of the stud 10 and is suitably rigidly secured thereto. Since the diameter of the annular flat surface 21 of the ball member 20 is substantially greater than the inner end diameter of the stud 10, a shoulder 24 is formed about the lateral peripheral surface of the ball member 20 and is arranged to abut the laterally extending annular surface 24a of nylon liner 17 which in turn abuts the lower end portion of the annular neoprene member 16 so that the ball member 20 serves to position the nylon liner 17 and the neoprene resilient member 16 within the inverted cup member 12.

As is well known in the art, a reaction plate or enclosure plate 25 having a centrally positioned concave socket 26 therein is positioned at the annular open end of the cup member 12 and is so positioned that the ball member 22 rests within the socket 26 for rotatable movement with respect thereto. In the past, however, the reaction plate 26 has generally been secured at the open end of the socket member 12 by peening or spinning the outer lip of the socket member over the reaction member 25 so that the reaction member was, for all practical purposes, permanently retained within the socket member 12. Applicant has, however, devised a means and method for readily removing the reaction plate 25 from the inverted cup member 12 so that the interior parts thereof may be serviced as desired in a manner which will hereafter be clearly and completely described in detail.

In the embodiment of the invention illustrated in FIGURE 3, the annular lip 27 of the cup member 12 is chamfered on the outer surface thereof as at 28 so that the lip 27 terminates at the outermost edge thereof in a relatively thin wall. The cup member 12 is then counterbored to provide an annular shoulder 29 adjacent the innermost edge of the lip 27. At this point in the manufacturing operation or prior thereto, the stud 10 and liner 17 and neoprene member 16 are inserted through the radially enlarged open end portion of the cup member 12. Thereafter, the reaction plate 25 which is diametrically smaller than the annular open end of the cup member 12 is inserted within the cup member so that the ball 22 is received within the socket 26. The reaction plate 25 is then pressed by suitable means from the broken line position illustrated in FIGURE 3 to the full line position illustrated therein thus compressing the neoprene bushing 16. While the reaction plate is in this preloaded position, a removable retaining ring 30, such as a spiral type retaining ring, is then placed within the annular open end of the cup member 12 and is seated upon the reaction plate 25 and the annular lip 27 is then spun-over the retaining ring 30 so that a retaining ring groove 31 is formed (see FIGURE 4). While the particular type of retaining ring used may be a matter of choice it should be of the type which may be radially inwardly compressed so that it can readily be removed from the groove 31.

The dimensional width of the retaining ring groove 31 may be so controlled in the spin-over operation that the groove can be formed to have a width greater than the total thickness of the retaining ring 30 in order to permit free removal of the ring from the groove for servicing of internal parts. Obviously, from the sales standpoint it would undoubtedly be advantageous to manufacture a device embodying the principles of this invention in the foregoing manner. However, if it is desired to economize production cost, it would be more economical to spin the lip 27 tightly over the retaining ring 30 in the spin-over operation. In this event, upon removal of the retaining ring 30 from the retaining ring groove 31 for servicing of the parts within the cup member 12, a thinner retaining ring could be used in the reassembly process.

Referring now more particularly to FIGURES 1, 2 and 5, it will be noted that the depending annular lip 27 of the cup member 12 is chamfered as at 28 in the manner hereinbefore described. However, in this embodiment of the invention, the cup member 12 is counterbored twice as at 33 and 34 during the counterboring operation so that the bore 34 adjacent the outermost edge of the lip 27 is diametrically greater than the bore 33 which, in turn, is diametrically greater than the inner annular surface of the wall 13 adjacent thereto. The bore 33 forms a shoulder 35 upon which the peripheral annular edge of the reaction plate 25 is arranged to seat.

It will herein be noted that the annular wall 37 intermediate the shoulder 35 and shoulder 38 formed by the bore 34 has a height less than the dimensional thickness of the reaction plate 25. In this manner, when a retaining ring, such as a split type removable retaining ring 40 is inserted within the open end of the cup member 12 the retaining ring will abut the lower lateral peripheral surface of the preloaded reaction plate 25 so that after the spin-over operation the reaction plate 25 will be rigidly maintained in engagement with the annular shoulder 35.

As has been hereinbefore explained, the spin-over operation may be so controlled that the lip 27 may be spun-over the retaining ring 40 tightly or in a manner to facilitate the free removal of the ring from the groove for the servicing of parts within the cup member 12.

In FIGURE 2 a split retaining ring is shown as being positioned within the retaining ring groove and as supporting the reaction plate 25. By pressing the free ends of the ring together, the ring can be removed in a manner well known in the art. Upon removal of the ring, access can obviously readily be had to the interior of the inverted cup for servicing or replacement of worn or damaged parts therein.

Thus, applicant has not only provided a means for readily gaining access to the interior of a joint socket assembly but has further devised a method for expeditiously manufacturing a socket or housing with a retaining ring groove without the necessity of machining, undercutting or the like expensive operations. The sockets or housings are inexpensively formed with retaining ring grooves adapted to releasably retain the ring, by merely inserting the ring in a counterbore and spinning or rolling the mouth of the bore to form the underlying lip, thereby providing the second side wall or shoulder of the groove. This spinning or rolling step not only initially closes up the socket but also provides the snap ring groove 31 useful in future assembly and reassembly.

Obviously, there are many and varied types of joint socket assemblies some of which utilize springs and/or bearings and others of which utilize rubber bushings and the like all of which, however, would be structurally improved if such a disassembly means as applicant has devised were incorporated therein.

It will be herein understood that this embodiment of the invention has been used for illustrative purposes only and that various modifications and variations of the present invention may be effected without departing from the novel spirit and scope of the concepts thereof.

I claim as my invention:

1. A ball joint assembly comprising, a cup-shaped housing having opposed first and second open ends, a ball stud having a head positioned within said housing and having a shank extended through said first open end of said housing, a self lubricating liner on the shank disposed within the housing, a rubber bushing mounted on the liner and the ball stud and seated against an interior surface of the cup-shaped housing between its opposed open ends, an annular shoulder formed adjacent said second open end of said housing, a reaction plate positioned within the second open end of said housing and having an outside diameter smaller than an inside diameter of said annular shoulder, said reaction plate having a bearing surface receiving said ball stud head in engagement therewith, a radially inwardly compressible removable split type retaining ring positioned against a bottom surface of said reaction plate, a spun over chamfered lip having an inside diameter larger than the outside diameter of said plate and with said lip defining a retaining ring groove with said annular shoulder with the lip tightly engaging a bottom surface of the removable retaining ring maintaining the rubber bushing and the reaction plate in compressed loaded position, and said split type retaining ring being spaced from said annular shoulder while said reaction plate is in compressed loaded position and with said split type ring being removable from said groove permitting said reaction plate to be moved axially of the lip into and out of said cup-shaped housing.

2. The method of closing and forming a snap ring groove in a hollow cup-shaped member having first and second open ends while simultaneously securing the components of a joint assembly in loaded relation comprising the steps of, chamfering an annular beveled lip on the outer surface of said first open ends, counterboring the first open end of said housing and providing a shoulder in the inner wall thereof, mounting a ball member having a ball at one end of its shank with a self lubricating liner on the shank and with an elastomeric bushing on the liner within the hollow cup-shaped member and projecting the shank through said second end, placing a reaction plate within said first open end, inserting a removable snap ring in the first open end and abutting the bottom surface of said reaction plate with said snap ring, pressing the ring towards the shoulder to a desired depth in the counterbore in spaced inward relation from the mouth of the counterbore and loading the bushing, spinning over the chamfered lip underlying the snap ring and controlling the internal periphery of the lip to a size larger than the periphery of the closure plate but smaller than the outer periphery of the snap ring forming a snap ring groove holding the ring in spaced relation from said shoulder and maintaining the bushing and the reaction plate in compressed loaded position and accommodating removal of the ring and reaction plate.

References Cited in the file of this patent

UNITED STATES PATENTS

| | | |
|---|---|---|
| 1,758,515 | Heiermann | May 13, 1930 |
| 1,973,847 | Orlow et al. | Sept. 18, 1934 |
| 1,983,947 | Rockwell | Dec. 11, 1934 |
| 1,985,781 | Hufferd et al. | Dec. 25, 1934 |
| 2,096,557 | Peo | Oct. 19, 1937 |
| 2,421,588 | Venditty | June 3, 1947 |
| 2,425,138 | Venditty | Aug. 5, 1947 |
| 2,471,672 | Booth | May 31, 1949 |
| 2,641,492 | Flumerfelt | June 9, 1953 |
| 2,755,116 | Alldredge | July 17, 1956 |
| 2,778,664 | Herbenar | Jan. 22, 1957 |
| 2,827,303 | Herbenar | Mar. 18, 1958 |
| 2,846,251 | Herbenar | Aug. 5, 1958 |
| 2,855,232 | Kozak | Oct. 7, 1958 |
| 2,880,025 | Herbenar et al. | Mar. 31, 1959 |
| 2,921,809 | Kogstrom | Jan. 19, 1960 |

FOREIGN PATENTS

| | | |
|---|---|---|
| 486,874 | Canada | Sept. 30, 1952 |
| 670,470 | Great Britain | Apr. 16, 1952 |